(12) United States Patent
Matsushita et al.

(10) Patent No.: US 7,717,163 B2
(45) Date of Patent: May 18, 2010

(54) HEAT EXCHANGER

(75) Inventors: Hirohiko Matsushita, Osaka (JP); Takahisa Sueoka, Osaka (JP); Shuji Ikegami, Osaka (JP); Shun Yoshioka, Osaka (JP); Eisaku Okubo, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 137 days.

(21) Appl. No.: 10/594,598

(22) PCT Filed: Mar. 29, 2005

(86) PCT No.: PCT/JP2005/005963

§ 371 (c)(1),
(2), (4) Date: Sep. 28, 2006

(87) PCT Pub. No.: WO2005/095882

PCT Pub. Date: Oct. 13, 2005

(65) Prior Publication Data

US 2007/0204979 A1    Sep. 6, 2007

(30) Foreign Application Priority Data

Mar. 31, 2004 (JP) .............................. 2004-101727
Mar. 31, 2004 (JP) .............................. 2004-101747
Mar. 31, 2004 (JP) .............................. 2004-101879
Mar. 31, 2004 (JP) .............................. 2004-101880

(51) Int. Cl.
*F28F 19/02* (2006.01)

(52) U.S. Cl. ...................................... 165/133; 165/151
(58) Field of Classification Search .................. 165/150, 165/151, 133, 134.1; 62/94, 238.3, 271; 427/409; 428/423.3, 424.4, 480
See application file for complete search history.

(56) References Cited

U.S. PATENT DOCUMENTS

| | | | | |
|---|---|---|---|---|
| 4,341,539 | A | * | 7/1982 | Gidaspow et al. .............. 96/127 |
| 4,674,563 | A | * | 6/1987 | Maier-Laxhuber et al. ........ 165/104.12 |
| 5,308,703 | A | * | 5/1994 | Tsujimoto et al. ............ 428/408 |
| 5,585,145 | A | * | 12/1996 | Maier-Laxhuber et al. .. 427/380 |
| 6,102,107 | A | * | 8/2000 | Dunne .................... 165/104.12 |
| 6,346,298 | B1 | * | 2/2002 | Takahashi et al. ........... 427/409 |
| 2005/0061483 | A1 | * | 3/2005 | Dunne et al. ............. 165/104.12 |

FOREIGN PATENT DOCUMENTS

| | | |
|---|---|---|
| JP | 7-265649 A | 10/1995 |
| JP | 8-126841 A | 5/1996 |
| JP | 8-200876 A | 8/1996 |
| JP | 8-271085 A | 10/1996 |
| JP | 8-313105 A | 11/1996 |

\* cited by examiner

*Primary Examiner*—Teresa J Walberg
(74) *Attorney, Agent, or Firm*—Birch, Stewart, Kolasch & Birch, LLP

(57) ABSTRACT

The difference in linear thermal expansion coefficient between the fins (57) and the adsorbent layer (58) is made smaller than the difference in the linear thermal expansion coefficient between the fins (57) and the adsorbent.

18 Claims, 10 Drawing Sheets

FIN PITCH 1.2mm

FIN PITCH 1.6mm

FIN PITCH 2.0mm

| Mass ratio | | Adhesion property of supported layer (initial) | Adsorption performance |
|---|---|---|---|
| Water-based emulsion binder | Adsorbent | | |
| 1 | 1 | ◎ | × |
| 1 | 3 | ◎ | ○ |
| 1 | 5 | ◎ | ◎ |
| 1 | 8 | ◎ | ◎ |
| 1 | 10 | ○ | ◎ |
| 1 | 15 | × | — |

HEAT EXCHANGER

TECHNICAL FIELD

The present invention relates to a heat exchanger. In particular, it relates to a heat exchanger used for a humidity control system or the like using an adsorbent and a refrigeration cycle to control humidity in the air.

BACKGROUND ART

As an example of a heat exchanger having a function of adsorbing moisture from the air and releasing the moisture into the air, Patent Publication 1 discloses a heat exchanger including a copper tube as a heat transfer tube and plate-like fins arranged to fit the circumference of the copper tube. An adsorbent capable of adsorbing and desorbing moisture from and into the air is supported on the surfaces of the copper tube and the fins.

The heat exchanger is used in a humidity control system using an adsorbent and a refrigeration cycle to control humidity in the air as disclosed in Patent Publication 1.

The humidity control system includes two heat exchangers. When the system is working, a hot refrigerant is supplied to the copper tube of one of the two heat exchangers such that the heat exchanger functions as an evaporator, while a cool refrigerant is supplied to the copper tube of the other heat exchanger such that the heat exchanger functions as a condenser. If the cool and hot refrigerants supplied to the copper tubes are switched alternately, the heat exchangers alternately function as the evaporator and the condenser.

Patent Publication 1: Japanese Unexamined Patent Publication No. H7-265649

DISCLOSURE OF THE INVENTION

When used in the humidity control system, the heat exchangers need to be heated and cooled repetitively to repeat adsorption and desorption of moisture from and into the air. As a result, the components of the heat exchangers, such as the fins and the adsorbent layer, repeat thermal expansion and contraction.

In general, the fins of the heat exchangers, the adsorbent and a layer for supporting the adsorbent have linear thermal expansion coefficients greatly different from each other depending on their materials. Therefore, if temperature is varied in the heat exchangers, thermal stress is generated due to the difference in linear thermal expansion coefficient between the adsorbent layer and the fins, thereby causing shear stress at a surface where the adsorbent layer and the fins are adhered to each other. As a result, the adsorbent layer may possibly fall off the fins.

In view of the above, the present invention has been achieved. An object of the present invention is to prevent the adsorbent layer from falling off the fins and improve the durability of the adsorbent layer.

MEANS OF SOLVING THE PROBLEM

A first aspect of the present invention is directed to a heat exchanger including a plurality of fins (57) and an adsorbent capable of adsorbing moisture from the air and desorbing the moisture into the air.

The surfaces of the fins (57) are covered with an adsorbent layer (58) containing the adsorbent and a binder for supporting the adsorbent on the surfaces of the fins (57). A difference in linear thermal expansion coefficient between the fins (57) and the adsorbent layer (58) is smaller than a difference in linear thermal expansion coefficient between the fins (57) and the adsorbent.

According to the first aspect of the present invention, the adsorbent is supported on the surfaces of the fins (57). When target air passes through the vicinity of the fins (57), moisture in the air is adsorbed by the adsorbent to dehumidify the target air. Heat generated by the moisture adsorption is collected by a heat transfer medium in the heat exchanger. If the heat transfer medium in the heat exchanger does not collect but supply the heat, the adsorbent is heated to desorb the moisture adsorbed thereto, thereby humidifying the target air. Specifically, the heat exchanger is cooled and heated repetitively such that the heat exchanger repeats the adsorption and desorption of moisture from and into the air.

The adsorbent is provided on the fins (57) as the adsorbent layer (58) containing the adsorbent and the binder. Each of the surfaces of the fins (57) is covered with the adsorbent layer (58). The binder glues particles of the adsorbent together and bonds the adsorbent particles to the surfaces of the fins (57).

In general, the adsorbent and the fins (57) have linear thermal expansion coefficients greatly different from each other depending on their materials. In the present invention, the binder is selected such that the linear thermal expansion coefficient of the adsorbent layer (58) containing the adsorbent and the binder is brought closer to the linear thermal expansion coefficient of the fins (57) than the linear thermal expansion coefficient of the adsorbent. Therefore, when the fins (57) thermally expand or contract to generate thermal strain, the adsorbent layer (58) thermally expands or contrasts in the same manner to generate thermal strain which is similar to that of the fins (57).

According to a second aspect of the present invention related to the first aspect, the binder has a linear thermal expansion coefficient not lower than the linear thermal expansion coefficient of the fins (57).

In general, a substance used as the adsorbent has a linear thermal expansion coefficient lower than the linear thermal expansion coefficient of the material for the fins (57) of the heat exchangers (47, 49). According to the second aspect of the invention, the adsorbent is mixed with the binder having a linear thermal expansion coefficient higher than the linear thermal expansion coefficient of the fins (57) such that the linear thermal expansion coefficient of the adsorbent layer (58) approaches the linear thermal expansion coefficient of the fins (57).

The linear thermal expansion coefficient of the adsorbent layer (58) greatly depends on the linear thermal expansion coefficients of the adsorbent and the binder contained therein and the mass ratio thereof. In the present invention, attention has been paid to the linear thermal expansion coefficient. The binder is selected such that the linear thermal expansion coefficient gradually increases in the order of the adsorbent, the fins (57) and the binder. The mass ratio between the adsorbent and the binder is determined depending on the adsorption and adhesion properties required for the adsorbent layer (58).

According to a third aspect of the present invention related to the first aspect, the binder is an organic water-based emulsion binder.

According to the third aspect of the invention, the organic water-based emulsion binder has higher flexibility than inorganic binders.

According to a fourth aspect of the present invention related to the third aspect, the water-based emulsion binder is a urethane resin, an acrylic resin or an ethylene-vinyl acetate copolymer.

A fifth aspect of the present invention is directed to a heat exchanger including a plurality of fins (57) and an adsorbent capable of adsorbing moisture from the air and desorbing the moisture into the air.

The surfaces of the fins (57) are covered with an adsorbent layer (58) containing the adsorbent and a binder for supporting the adsorbent on the surfaces of the fins (57). The adsorbent layer (58) is configured to follow thermal expansion or contraction of the fins (57) caused by temperature change without falling off the fins (57).

According to the fifth aspect of the invention, the adsorbent is supported on the surfaces of the fins (57). When target air passes through the vicinity of the fins (57), moisture in the air is adsorbed by the adsorbent to dehumidify the target air. Heat generated by the moisture adsorption is collected by a heat transfer medium in the heat exchanger. If the heat transfer medium in the heat exchanger does not collect but supply the heat, the adsorbent is heated to desorb the moisture adsorbed thereto, thereby humidifying the target air. Specifically, the heat exchanger is cooled and heated repetitively such that the heat exchanger repeats the adsorption and desorption of moisture from and into the air.

The adsorbent is provided on the fins (57) as the adsorbent layer (58) containing the adsorbent and the binder. Each of the surfaces of the fins (57) is covered with the adsorbent layer (58). The binder glues particles of the adsorbent together and bonds the adsorbent particles to each of the surfaces of the fins (57).

When the fins (57) thermally expand or contract due to temperature change, the adsorbent layer (58) follows the expansion or contraction of the fins (57). Therefore, the adsorbent layer (58) does not fall off the fins (57).

According to a sixth aspect of the present invention related to the first aspect, the adsorbent layer (58) satisfies $t/\lambda \leqq 10$ wherein t is a thickness (mm) of the adsorbent layer (58) and $\lambda$ is a thermal conductivity (W/mK) of the adsorbent layer (58) in the thickness direction.

The heat exchanger according to the sixth aspect of the present invention may be a heat exchanger including a plurality of fins (57) and an adsorbent capable of adsorbing moisture from the air and desorbing the moisture into the air, wherein the adsorbent layer (58) satisfies $t/\lambda \leqq 10$ wherein t is a thickness (mm) of the adsorbent layer (58) and $\lambda$ is a thermal conductivity (W/mK) of the adsorbent layer (58) in the thickness direction.

To be more specific, for example, an adhesive layer containing silica gel and about 3 to 6% vinyl acetate resin in the weight ratio is formed on the surfaces of the tube and the fins (Japanese Unexamined Patent Publication H8-200876). In general, however, an adsorbent such as silica gel which adsorbs and desorbs moisture from and into the air does not have a very high thermal conductivity value. Therefore, when the adhesive layer of silica gel or the like is formed on the surfaces of the fins as described above, heat exchange between fluid passing through a fluid passage formed inside the tube and the target air becomes less efficient. That is, according to the conventional techniques, the amount of sensible heat exchanged may possibly be reduced.

According to the sixth aspect of the invention, even if the layer for supporting the adsorbent on the surfaces of the fins is formed, the amount of sensible heat exchanged by the heat exchanger is prevented from decreasing.

According to a seventh aspect of the present invention related to the sixth aspect, a fin pitch is not less than 1.2 mm and not more than 3.5 mm.

According to an eighth aspect of the present invention related to the sixth aspect, air velocity is not less than 0.5 m/s and not more than 1.5 m/s.

According to a ninth aspect of the present invention related to the sixth aspect, the thickness t (mm) of the adsorbent layer (58) is not less than 0.05 mm and not more than 0.5 mm.

According to a tenth aspect of the present invention related to the sixth aspect, the thermal conductivity $\lambda$ (W/mK) of the adsorbent layer (58) is not less than 0.05 W/mK and not more than 1.00 W/mK.

According to an eleventh aspect of the present invention related to the sixth aspect, the heat exchanger (47 or 49) is a fin-and-tube heat exchanger.

According to a twelfth aspect of the present invention related to the first aspect, supposing that an adsorbent content ratio in the adsorbent layer (58) is expressed by the mass ratio between the adsorbent and the binder (mass of the adsorbent/mass of the binder), part of the adsorbent layer (58) adjacent to the surface of the fin (57) has a higher adsorbent content ratio than an outermost part of the adsorbent layer (58) in the thickness direction.

The heat exchanger according to the twelfth aspect of the invention may be a heat exchanger including a plurality of fins (57) and an adsorbent (60) supported on the surface of the heat exchanger and capable of adsorbing moisture from the air and desorbing the moisture into the air, wherein the surfaces of the fins (57) are covered with an adsorbent layer (58) containing the adsorbent (60) and a binder (62) for supporting the adsorbent (60) on the surfaces of the fins (57) and supposing that an adsorbent content ratio is expressed by the mass ratio between the adsorbent and the binder (mass of the adsorbent/mass of the binder), part of the adsorbent layer (58) adjacent to the surface of the fin (57) has a higher adsorbent content ratio than an outermost part of the adsorbent layer (58) in the thickness direction.

In order to improve humidity control capability, in general, the adsorption performance of the heat exchanger has to be improved. An available means of improving the adsorption performance is to increase the amount of the adsorbent supported on the fins. For example, the amount of the supported adsorbent is increased while the surface area of the fins is kept unchanged or the surface area of the fins is increased to support a larger amount of the adsorbent on the fins.

If the amount of the adsorbent is increased with the surface area of the fins kept unchanged, the adsorbent layer becomes thick. The thick adsorbent layer reduces the rigidity of the adsorbent layer in the thickness direction. As a result, the adsorbent layer is more likely to fall off the fins and the adhesion between the adsorbent layer and the fins deteriorates. On the other hand, if the surface area of the fins is increased, the adhesion between the adsorbent layer and the fins is maintained but the size of the heat exchanger increases. This leads to the upsizing of the whole system and therefore it is not practical.

According to the twelfth aspect of the invention, the adsorbent layer (58) is thick to some extent. In this adsorbent layer (58), the adsorbent content ratio expressed by the adsorbent/binder mass ratio is not made uniform in the thickness direction. Instead, the adsorbent content ratio is varied between part of the adsorbent layer (58) adjacent to the fin and an outermost part of the adsorbent layer (58).

Specifically, the adsorbent content ratio in the part adjacent to the fins is made lower than that in the outermost part. That is, a relatively large amount of the binder (62) is contained in the part adjacent to the fins and a relatively large amount of the adsorbent (60) is contained in the outermost part.

The part adjacent to the surface of the fin (57) including the interface between the adsorbent layer (58) and the surface of the fin (57) contains a relatively large amount of the binder (62) which functions as an adhesive. Therefore, the part adjacent to the fin improves in adhesion to the fin (57) at the interface therebetween. Since the adsorbent content ratio is expressed by the adsorbent/binder ratio, the adsorbent content ratio in the part of the adsorbent layer (58) adjacent to the fin may be zero, i.e., the adjacent part may be consisted of the binder (62) only. In such a case, the maximum adhesion is obtained.

The outermost part of the adsorbent layer (58) which is outermost of the adsorbent layer (58) in the thickness direction is most likely to contact the air and contains a relatively large amount of the adsorbent (60). Therefore, the adsorption property is improved.

According to a thirteenth aspect of the present invention related to the twelfth aspect, the adsorbent layer (58) has a multilayered structure in which the adsorbent content ratio varies in the thickness direction.

According to the thirteenth aspect of the invention, the adsorbent content ratio in the adsorbent layer (58) varies layer by layer. Specifically, in part of the adsorbent layer (58) adjacent to the surface of the fin (57), an adjacent layer (58a) containing a relatively large amount of the binder (62) is formed. Further, in part of the adsorbent layer (58) outermost in the thickness direction, an outermost layer (58d) containing a relatively large amount of the adsorbent (60) is formed.

Since the adsorbent layer (58) is multilayered, the adsorbent layer (58) is highly resistant against cracks that occur in the thickness direction. For example, suppose that the adsorbent layer (58) is a monolayer and a bending load is applied thereto to generate a crack in the thickness direction, the crack easily grows and reaches the surface of the fin (57). According to the thirteenth aspect of the invention, however, the adsorbent layer (58) is multilayered. Therefore, the growth of the crack stops at the interface between the layers, thereby preventing the crack from reaching the surface of the fin (57).

According to a fourteenth aspect of the present invention related to the thirteenth aspect, the adsorbent content ratio in the adsorbent layer (58) is reduced toward the fin (57).

According to the fourteenth aspect of the invention, in the thickness direction of the adsorbent layer (58), the adsorbent content ratio in the adjacent layer (58a) in contact with the surface of the fin (57) is the lowest and the adsorbent content ratio in the outermost layer (58d) is the highest. The adsorbent content ratio in the adsorbent layer (58) gradually increases from the adjacent layer (58a) to the outermost layer (58d).

Since the adsorbent content ratio is gradually changed, the adjacent layer (58a) is less likely to fall off the surface of the fin (57), as well as a layer (58b) outside the adjacent layer (58a). Further, a layer (58c) inside the outermost layer (58d) which is likely to contact with the target air and contains a large amount of the adsorbent (60) is prone to adsorb moisture in the target air. That is, among the layers in the adsorbent layer (58), the layers (58a, 58b) closer to the fin have excellent adhesion property, while the layers (58c, 58d) have great adsorption property. Thus, the multilayered adsorbent layer (58) is improved both in adhesion and adsorption properties.

According to a fifteenth aspect related to the twelfth aspect, the adsorbent (60) is zeolite, silica gel or a mixture thereof and the binder (62) is a urethane resin, an acrylic resin or an ethylene-vinyl acetate copolymer.

According to the fifteenth aspect of the invention, the urethane resin, acrylic resin or ethylene-vinyl acetate copolymer is more excellent in resistance against impact than inorganic binders such as cement.

According to a sixteenth aspect of the present invention related to the first aspect, the adsorbent layer (58) is a solid layer formed by drying an organic water-based emulsion binder mixed with an adsorbent.

According to the sixteenth aspect of the invention, the heat exchanger may be a heat exchanger for use in a humidity control system, wherein an adsorbent is supported on the surface of a main body provided with a plurality of fins (57) such that the adsorbent is heated or cooled by a refrigerant flowing inside the main body to adsorb or desorb moisture from or into the air flowing outside the main body and the adsorbent layer (58) on the surfaces of the fins (57) may be a solid layer formed by drying an organic water-based emulsion binder mixed with the adsorbent.

In general, latent heat processing capability is enhanced by supporting the adsorbent on the surfaces of the fins of the heat exchanger. If a larger amount of the adsorbent is supported on the surfaces of the fins in order to further improve the latent heat processing capability, the adsorbent layer (58) becomes thick to decrease the degree of adhesion between the fins and the adsorbent layer (58). In particular, the fins and the adsorbent layer (58) have a significant difference in thermal expansion coefficient. Therefore, the adhesion property is a serious concern in the environment where abrupt temperature change occurs due to repetitive heating and cooling. On the other hand, if the amount of the adsorbent supported on the surfaces of the fins is reduced, the heat exchanger components must be upsized to ensure the latent heat processing capability as required.

Therefore, according to the sixteenth aspect of the invention, the adsorbent layer (58) is a solid layer formed by drying an organic water-based emulsion binder mixed with an adsorbent.

According to a seventeenth aspect of the present invention related to a sixteenth aspect, the adsorbent is zeolite, silica gel or a mixture thereof, the water-based emulsion binder is a urethane resin, an acrylic resin or an ethylene-vinyl acetate copolymer and the mass ratio between a solid portion of the water-based emulsion binder and the adsorbent is not lower than 1:3 and not higher than 1:10.

According to an eighteenth aspect of the present invention related to the sixteenth aspect, the thickness t (mm) of the adsorbent layer (58) is not less than 0.05 mm and not more than 0.5 mm.

EFFECT OF THE INVENTION

According to the present invention, the difference in linear thermal expansion coefficient between the fins (57) and the adsorbent layer (58) is set smaller than the difference in linear thermal expansion coefficient between the fins (57) and the adsorbent such that the linear thermal expansion coefficient of the adsorbent layer (58) approaches the linear thermal expansion coefficient of the fins (57). Accordingly, even if the fins (57) thermally expand or contract repetitively due to heating or cooling, the adsorbent layer (58) follows the thermal expansion or contraction of the fins (57), thereby reducing shear stress caused at the surface where the fin and the adsorbent layer are adhered to each other. As a result, the adsorbent layer (58) is prevented from falling off the fin (57), thereby improving the durability of the adsorbent layer (58).

It is preferred that the linear thermal expansion coefficient of the adsorbent layer (58) is substantially the same as the linear thermal expansion coefficient of the fins (57). In such a case, the adsorbent layer (58) and the fins (57) cause substantially the same thermal strain. Therefore, shear stress hardly occurs at the surface where the fin and the adsorbent layer are adhered to each other.

According to the second aspect of the invention, the linear thermal expansion coefficient of the binder is set higher than the linear thermal expansion coefficient of the fins (57) such that the linear thermal expansion coefficient of the adsorbent layer (58) effectively approaches the linear thermal expansion coefficient of the fins (57).

According to the third aspect of the invention, the organic water-based emulsion binder is used. As the organic water-based emulsion binder is more flexible than inorganic binders, the obtained adsorbent layer (58) is highly resistant against abrupt temperature change and impact and less likely to fall off, thereby obtaining excellent adhesion property. Even if the linear thermal expansion coefficients of the fins (57) and the adsorbent layer (58) do not match exactly, thermal stress caused by the mismatch is absorbed by the flexibility of the adsorbent layer (58) itself. As a result, the adsorbent layer (58) further improves in ability to follow the thermal expansion and contraction of the fins (57) and achieves enhanced durability.

According to the fifth aspect of the invention, even if the fins (57) repeat thermal expansion and contraction due to heating and cooling, the adsorbent layer (58) follows the thermal expansion and contraction of the fins (57). Therefore, shear stress caused at the surface where the fin and the adsorbent layer are adhered to each other is reduced and the adsorbent layer (58) is less likely to fall off the fins (57). As a result, the adsorbent layer (58) improves in durability.

According to the sixth aspect of the invention, the thickness t (mm) and the thermal conductivity $\lambda$ (W/mK) in the thickness direction of the adsorbent layer (58) satisfy $t/\lambda \leq 10$. Therefore, the amount of sensible heat exchanged is prevented from decreasing.

In general, an adsorbent such as silica gel which adsorbs and desorbs moisture from and into the air does not have a very high thermal conductivity value. Therefore, when the adhesive layer of silica gel or the like is formed on the surfaces of the fins in a conventional manner, heat exchange between the refrigerant and the target air becomes less efficient and the amount of sensible heat exchanged may possibly be reduced.

According to the sixth aspect of the invention, $t/\lambda \leq 10$ is satisfied. Therefore, when an adsorbent having low thermal conductivity is used to form the adsorbent layer (58), the adsorbent layer (58) is made thin. On the other hand, when an adsorbent having high thermal conductivity is used, the adsorbent layer (58) is made thick.

As a result, thermal resistance of the adsorbent layer (58) is kept low. Therefore, the efficiency of heat exchange between the refrigerant circulating in the refrigeration circuit and the target air is not reduced. In other words, the amount of sensible heat exchanged in the first and second heat exchangers (47, 49) is prevented from decreasing.

According to the seventh aspect of the invention, the heat exchanger is provided in which the fins are arranged at a commercially effective pitch.

According to the eighth aspect of the invention, the velocity of the target air is set to a practical level.

According to the ninth aspect of the invention, the thickness t (mm) of the adsorbent layer (58) is set to be practically effective one. Specifically, if the thickness t (mm) of the adsorbent layer (58) is not less than 0.05 mm, the heat exchangers (47, 49) are downsized to a commercially effective level. Further, if the thickness t (mm) of the adsorbent layer (58) is not more than 0.5 mm, the noise of the first and second heat exchangers (47, 49) while they are working is reduced. Thus, the size of the heat exchangers (47, 49) is reduced to a commercially effective one and the noise of the first and second heat exchangers (47, 49) while they are working is reduced.

According to the twelfth aspect of the invention, the adsorbent content ratio in part of the adsorbent layer (58) adjacent to the fin is made smaller than the adsorbent content ratio in an outermost part of the adsorbent layer (58). As a result, the adsorbent layer (58) is improved in both adhesion to the surface of the fin (57) and adsorption of moisture from the air.

According to the thirteenth aspect of the invention, the adsorbent layer (58) is multilayered such that the adsorbent content ratio varies in the thickness direction. Therefore, the adsorbent layer (58) becomes resistant against cracks that occur in the thickness direction.

According to the fourteenth aspect of the invention, the adsorbent content ratio in the adsorbent layer (58) decreases toward the fin (57). As a result, the adsorbent layer (58) itself improves in adhesion and adsorption properties.

According to the fifteenth aspect of the invention, the adsorbent layer (58) becomes highly resistant against impact as compared with when an inorganic binder such as cement is used. Therefore, the falling off of the adsorbent layer (58) due to oscillation or the like is less likely to occur.

According to the sixteenth aspect of the invention, the adsorbent layer (58) on the surfaces of the fins (57) is a solid layer formed by drying an organic water-based emulsion binder mixed with an adsorbent. Therefore, as compared with a solid layer formed by drying an inorganic binder, the obtained layer is more flexible, resistant against abrupt temperature change and impact and achieves excellent adhesion property. Therefore, even if the amount of the adsorbent par unit area is increased, the excellent adhesion property is maintained. Thus, the latent heat processing capability is enhanced without increasing the thickness of the adsorbent layer (58) more than necessary or upsizing the heat exchangers (47, 49).

According to the seventeenth aspect of the invention, the mass ratio between the solid portion of the water-based emulsion binder and the adsorbent is not lower than 1:3 and not higher than 1:10. Therefore, sufficient adhesion property is maintained even if the temperature is varied in a wide range.

According to the eighteenth aspect of the invention, the thickness t of the adsorbent layer (58) is not less than 0.05 mm and not more than 0.5 mm. As a result, pressure loss is reduced, fan efficiency is improved and fan noise is reduced.

EXPLANATION OF REFERENCE NUMERALS

47 First heat exchanger (Heat exchanger)
49 Second heat exchanger (Heat exchanger)
57 Fin
58 Adsorbent layer

BEST MODE FOR CARRYING OUT THE INVENTION

Hereinafter, detailed explanation of embodiments of the present invention is provided with reference to the drawings.

Embodiment 1

—Structure of Humidity Control System—
(Overall Structure of the System)

Figure 1:
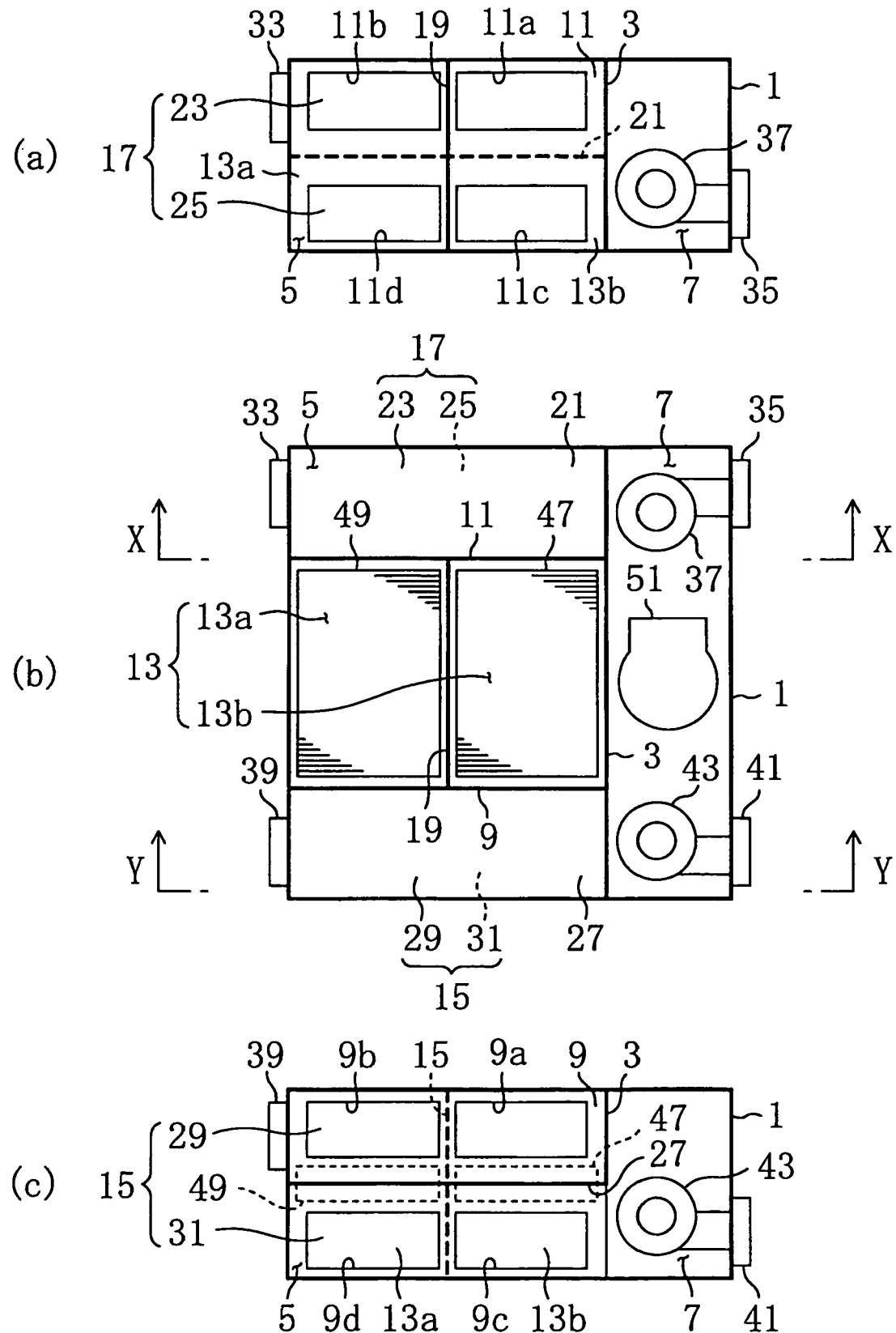
FIGS. 1(a) to 1(c) are schematic views illustrating the structure of a humidity control system according to Embodiment 1.

FIGS. 1(a) to 1(c) are schematic views illustrating the structure of a humidity control system to which a heat exchanger according to the embodiment of the present invention is applied. FIG. 1(a) is a sectional view taken along the line X-X shown in FIG. 1(b), FIG. 1(b) is a plan view illustrating the inside of the system with the front of the system facing the bottom of the figure and FIG. 1(c) is a sectional view taken along the line Y-Y shown in FIG. 1(b). The humidity control system includes a casing (1) in the form of a rectangular box. A first partition plate (3) extending from front to back is arranged in the casing (1) in order to divide space in the casing (1) into a first spatial area (5) on the left and a second spatial area (7) on the right which is smaller in volume than the first spatial area (5). In the first spatial area (5), a second partition plate (9) and a third partition plate (11) extending from side to side and parallel to each other are provided in order to divide the first spatial area (5) into a third spatial area (13) in the middle, a fourth spatial area (15) at the front and a fifth spatial area (17) at the back. The volume of the third spatial area (13) is larger than the volumes of the fourth and fifth spatial areas (15, 17). The third spatial area (13) is further divided into a left spatial area (13a) and a right spatial area (13b) by a fourth partition plate (19) extending from front to back. The fifth spatial area (17) at the back is divided into an upper part and a lower part by a fifth partition plate (21) extending horizontally from side to side. The upper part serves as a first flow-in passage (23) and the lower part serves as a first flow-out passage (25). The fourth spatial area (17) at the front is also divided into an upper part and a lower part by a sixth partition plate (27) extending horizontally from side to side. The upper part serves as a second flow-in passage (29) and the lower part serves as a second flow-out passage (31).

In the third partition plate (11), four apertures including first to fourth apertures (11a to 11d) are provided at the top left, top right, bottom left and bottom right of the third partition plate (11), respectively, such that the left and right spatial areas (13a, 13b) of the third spatial area (13) communicate with the first flow-in passage (23) and the first flow-out passage (25) (see FIG. 1(a)). Further, the second partition plate (9) is also provided with four apertures including fifth to eighth apertures (9a to 9d) which are arranged at the top left, top right, bottom left and bottom right of the second partition plate (9), respectively, such that the left and right spatial areas (13a, 13b) of the third spatial area (13) communicate with the second flow-in passage (29) and the second flow-out passage (31) (see FIG. 1(c)). The first to fourth apertures (11a to 11d) and the fifth to eighth apertures (9a to 9d) are provided with an open/close damper, respectively, though not shown.

In a rear part of the left side surface of the casing (1), an outside air inlet (33) is formed to communicate with the first flow-in passage (23). Further, an exhaust outlet (35) is formed in a rear part of the right side surface of the casing (1). The exhaust outlet (35) is connected to an exhaust fan (37) arranged in a rear part of the second spatial area (29) to communicate with the first flow-out passage (25). In a front part of the left side surface of the casing (1), a room air inlet (39) is formed to communicate with the second flow-in passage (29). Further, an air supply outlet (41) is formed in a front part of the right side surface of the casing (1). The air supply outlet (41) is connected to an air supply fan (43) arranged in a front part of the second spatial area (7) to communicate with the second flow-out passage (31).

Figure 2:
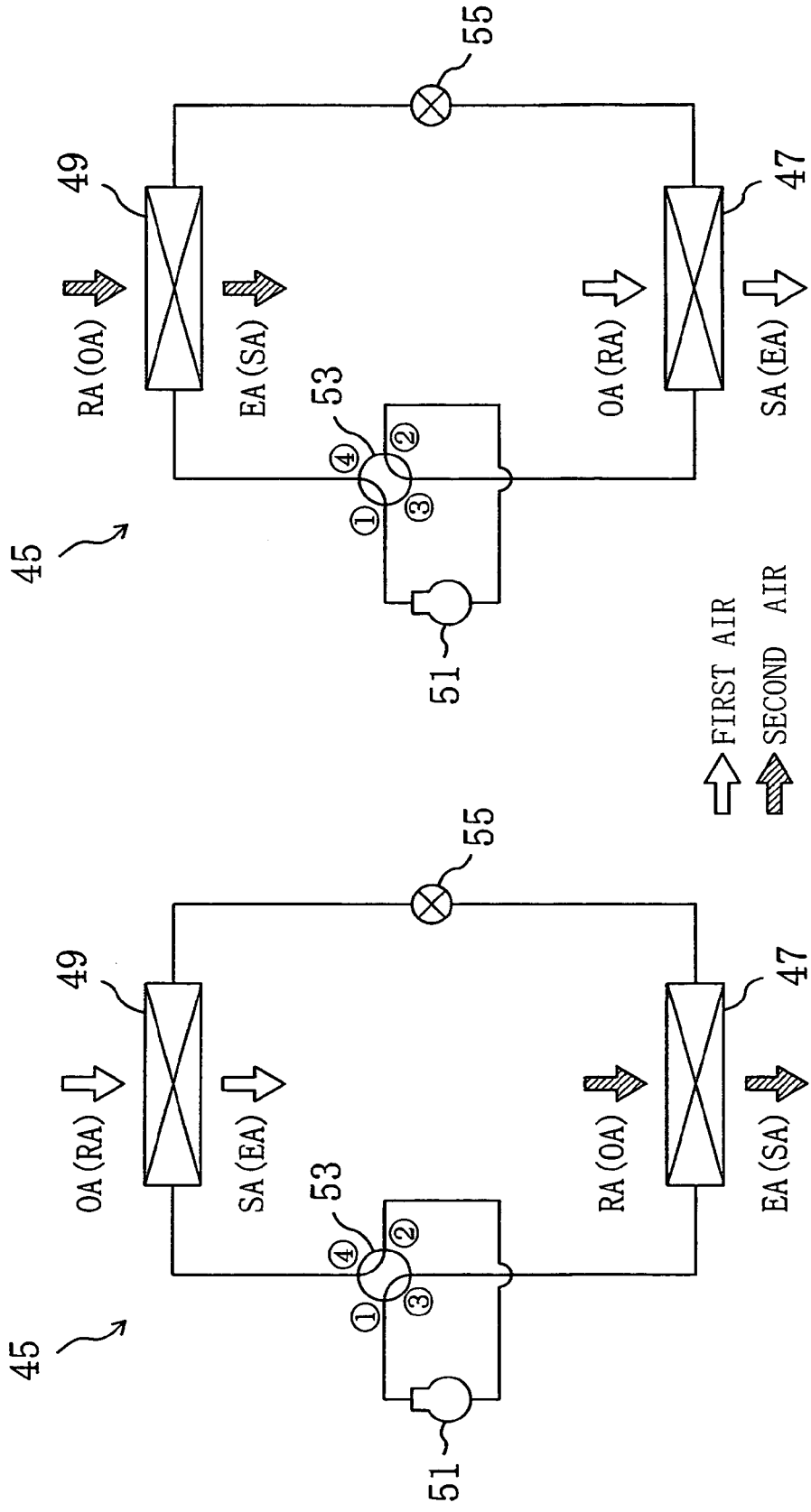
FIGS. 2(a) and 2(b) are views illustrating a piping system of a refrigerant circuit of a humidity control system according to Embodiment 1.

The thus-configured casing (1) contains a refrigerant circuit (45) as shown in FIGS. 2(a) and 2(b). The refrigerant circuit (45) is a closed circuit including a first heat exchanger (47), a second heat exchanger (49), a compressor (51), a four-way switch valve (53) and a motor-operated expansion valve (55) and filled with a refrigerant. When the refrigerant is circulated, a vapor compression refrigeration cycle occurs.

To be more specific, a discharge side and a suction side of the compressor (51) are connected to a first port and a second port of the four-way switch valve (53), respectively. One end of the first heat exchanger (47) is connected to a third port of the four-way switch valve (53) and the other end is connected to one end of the second heat exchanger (49) via the motor-operated expansion valve (55). The other end of the second heat exchanger (49) is connected to a fourth port of the four-way switch valve (53). The four-way switch valve (53) is configured to be able to switch between the state where the first and third ports communicate with each other and the second and fourth ports communicate with each other (the state shown in FIG. 2(a)) and the state where the first and fourth ports communicate with each other and the second and third ports communicate with each other (the state shown in FIG. 2(b)).

According to the switching by the four-way switch valve (53), the refrigerant circuit (45) is switched between a first refrigeration cycle where the first heat exchanger (47) functions as a condenser and the second heat exchanger (49) functions as an evaporator and a second refrigeration cycle where the first heat exchanger (47) functions as an evaporator and the second heat exchanger (49) functions as a condenser. As shown in FIGS. 1(a) to 1(c), in the refrigerant circuit (45), the first heat exchanger (47) is disposed in the right spatial area (13b) of the third spatial area (13), the second heat exchanger (49) is disposed in the left spatial area (13a) of the third spatial area (13) and the compressor (51) is disposed in the middle of the second spatial area (7) in the direction from front to back. Though not shown, the four-way switch valve (53) and the motor-operated expansion valve (55) are also arranged in the second spatial area (7).

(Heat Exchanger)

Figure 3:
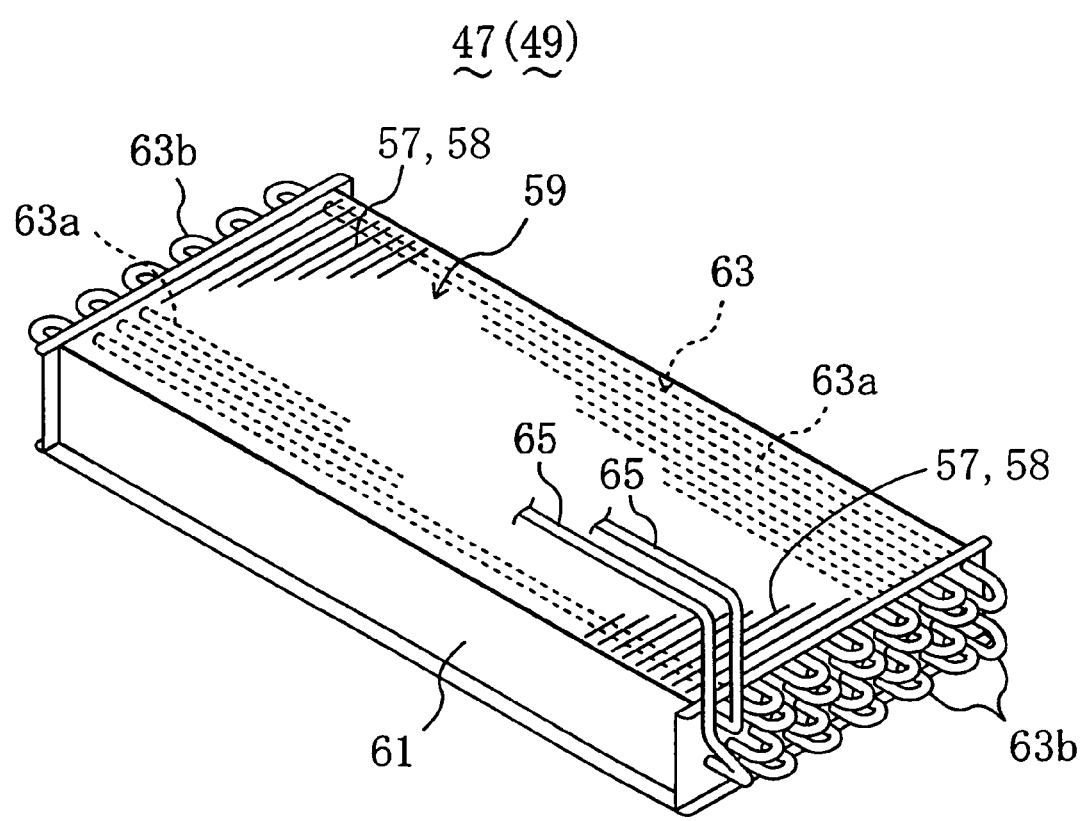
FIG. 3 is a perspective view illustrating first and second heat exchangers according to Embodiment 1.
Figure 4:
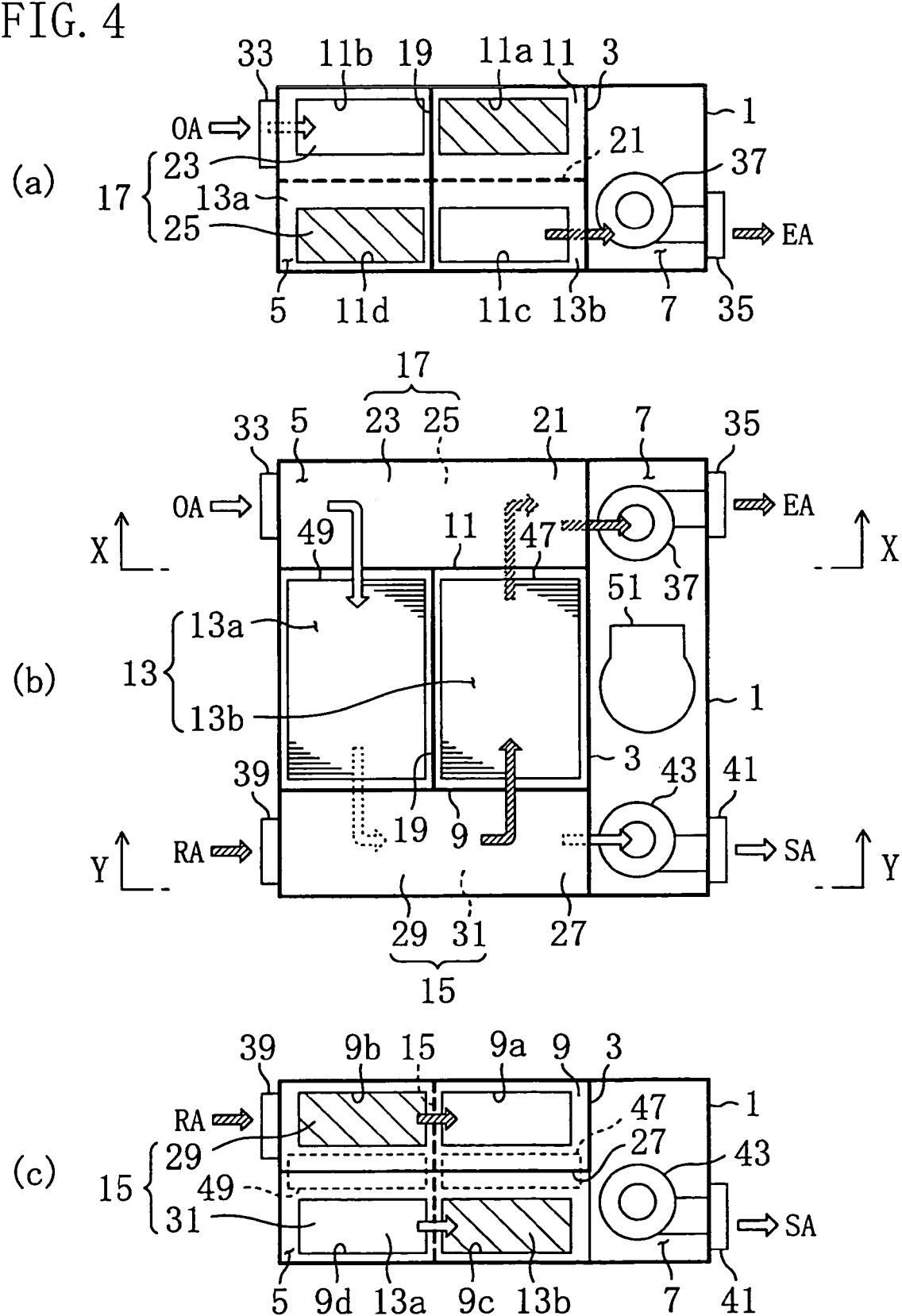
FIGS. 4(a) to 4(c) are schematic views illustrating a humidity control system together with the flow of air during a first action of dehumidifying operation.
Figure 5:
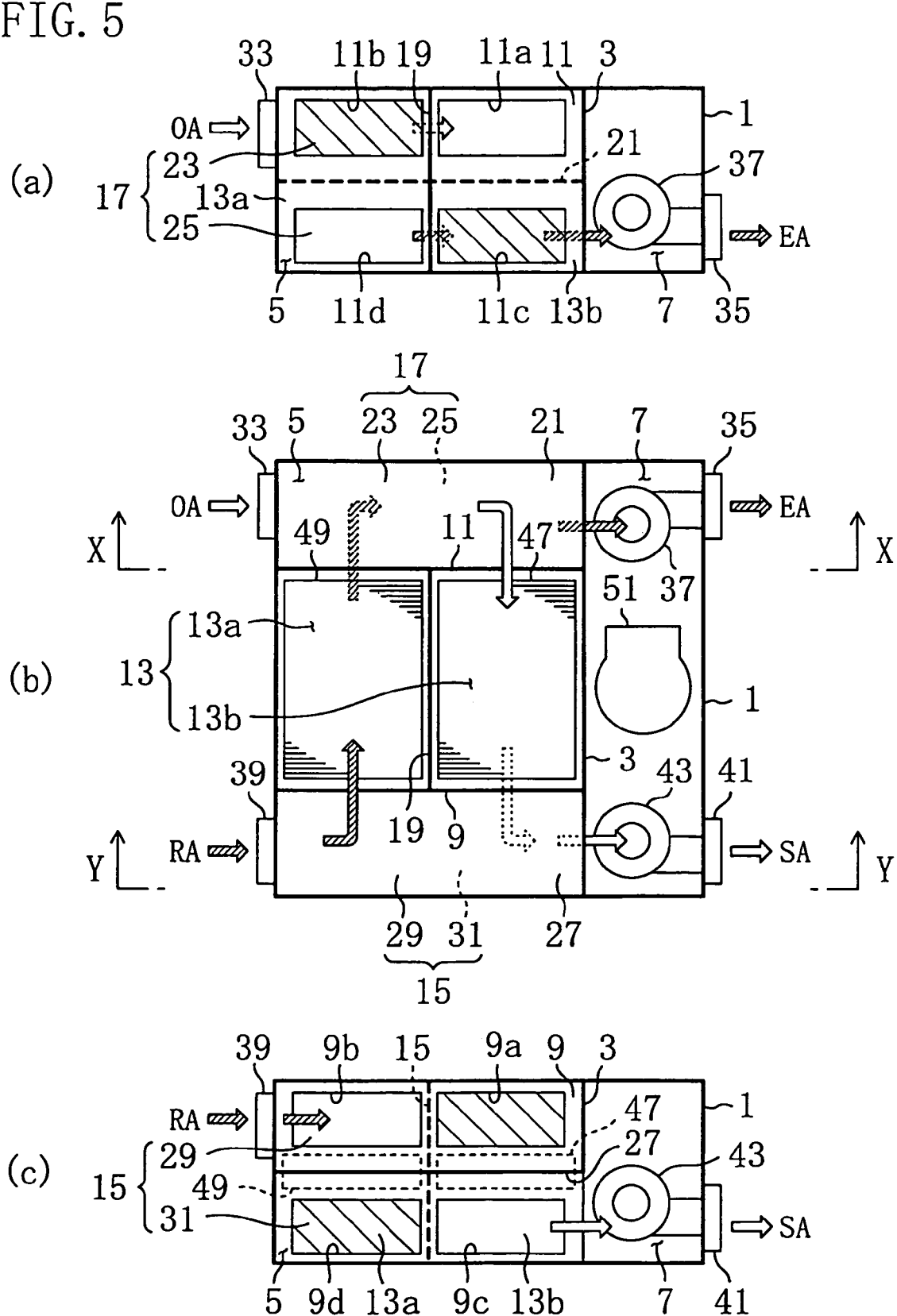
FIGS. 5(a) to 5(c) are schematic views illustrating the humidity control system together with the flow of air during a second action of the dehumidifying operation.

The first and second heat exchangers (47, 49) are "cross-fin" type fin-and-tube heat exchangers as shown in FIG. 3 and each of them includes a fin set (59) consisted of a plurality of aluminum alloy fins (57) arranged parallel to each other with an interval therebetween. The end faces of the fin set (59) in the arrangement direction of the fins and the end faces of the fin set (59) in the lengthwise direction of the fins are surrounded by a rectangular metallic framework (61). The first and second heat exchangers (47, 49) are disposed in the left and right spatial areas (13a, 13b) of the third spatial area (13) via the framework (61), respectively.

The fin set (59) is provided with a heat transfer tube (63). The heat transfer tube (63) is serpentine and has straight parts (63a) and U-shaped parts (63b). The straight parts (63a) penetrate the fin set (59) in the arrangement direction of the fins and the U-shaped parts (63b) protrude out of the framework (61). One end of the heat transfer tube (63) is connected to one end of a connector tube (65) such that the heat transfer tube (63) is connected to a refrigerant pipe (not shown) via the connector tube (65).

As a feature of the present invention, an adsorbent layer (58) containing an adsorbent and a binder is applied to the surfaces of the fins (57) of the first and second heat exchangers (47, 49). Zeolite and a urethane resin are used as the adsorbent and the binder, respectively. The linear thermal expansion coefficient of an aluminum alloy used as material for the fins (57) is $23.6 \times 10^{-6}$ ($K^{-1}$), while the linear thermal expansion coefficients of zeolite and the urethane resin are 4.5 to $6.1 \times 10^{-6}$ ($K^{-1}$) and 100 to $200 \times 10^{-6}$ ($K^{-1}$), respectively.

The adsorbent layer (58) contains zeolite and the urethane resin in the mass ratio of 5:1 to 8:1. In the adsorbent layer (58) laminated on the fins (57), the binder glues the adsorbent and the fins (57) together and particles of the adsorbent together.

The linear thermal expansion coefficients of the fins (57) and the adsorbent (zeolite) are significantly different from each other. Therefore, when the heat exchangers (47, 49) are heated or cooled, their thermal strains are considerably varied. Suppose that the adsorbent is supported on the surfaces of the fins (57) using a binder having a linear thermal expansion coefficient substantially the same as or not higher than that of the adsorbent, thermal stress derived from the difference between their linear thermal expansion coefficients is applied as shear stress to the interface between the adsorbent layer (58) and the fins (57). The shear stress is high especially at the edges and holes of the fins (57). This is one of major causes of the falling of the adsorbent layer (58) off the fins (57).

As a solution to this, a suitable binder is selected such that the linear thermal expansion coefficient of the binder existing between the adsorbent and the fins (57) and between the particles of the adsorbent becomes higher than that of the material for the fins (57), i.e., the linear thermal expansion coefficient of the material for the fins (57) comes between the linear thermal expansion coefficients of the adsorbent and the binder.

By so doing, the linear thermal expansion coefficient of the adsorbent layer (58) is brought closer to the linear thermal expansion coefficient of the fins (57) as compared with the case where only the adsorbent is used. That is, when the fins (57) expand or contract by heating or cooling, the adsorbent having a relatively low linear thermal expansion coefficient than the fins (57) does not cause thermal strain as significant as that caused by the fins (57). However, the binder existing between the adsorbent particles and having a relatively high linear thermal expansion coefficient than the fins (57) causes thermal strain more considerably than the fins (57). As the binder makes up for the thermal strain of the adsorbent, the adsorbent layer (58) is able to follow the thermal expansion or contraction of the fins (57).

As the binder, a urethane resin which belongs to an organic water-based emulsion binder is used. Therefore, higher flexibility is obtained as compared with the case where an inorganic binder is used. Even if the adsorbent layer fails to follow the thermal expansion and contraction of the fins (57) completely, thermal stress caused by the failure is absorbed by the flexibility of the urethane resin.

Specifically, the ability of the adsorbent layer (58) to follow the thermal expansion or contraction of the fins (57) is improved by bringing the linear thermal expansion coefficient of the adsorbent layer (58) closer to the linear thermal expansion coefficient of the fins (57) using the water-based emulsion binder and the flexibility of the water-based emulsion binder itself.

The adsorbent layer (58) is formed in the following manner. First, the fins (57) are subjected to surface treatment, and then slurry prepared by mixing the adsorbent and a binder solution is applied thereto and dried to solidify. Thus, the adsorbent and the fins (57) are bonded by the binder, so are the adsorbent particles. As the surface treatment, degreasing treatment may be carried out to render the surfaces of fins (57) nonrepellent to the slurry.

In the heat exchangers (47, 49), the adsorbent layer (58) is laminated not only on the surfaces of the fins (57) but also on the heat transfer tube (63), the connector tube (65) and the framework (61) to improve the adsorption property of the heat exchangers (47, 49).

—Humidity Control Operation by Humidity Control System—

Referring to FIGS. 4 to 7, explanation of how the thus-configured humidity control system performs humidity control operation is provided.

The humidity control system is capable of switching between dehumidifying operation and humidifying operation. During the dehumidifying or humidifying operation, a first action and a second action are alternately repeated.

(Dehumidifying Operation)

In the dehumidifying operation, an air supply fan (43) and an exhaust fan (37) are operated in the humidity control system. The humidity control system takes outside air (OA) therein as first air to supply it to the inside of the room and takes room air (RA) therein as second air to exhaust it to the outside of the room.

First, explanation of a first action during the dehumidifying operation is provided with reference to FIGS. 2(a) and 2(b) and FIGS. 4(a) to 4(c). In the first action, the adsorbent is recovered in the first heat exchanger (47) and the outside air (OA) as the first air is dehumidified in the second heat exchanger (49).

During the first action, the four-way switch valve (53) in the refrigerant circuit (45) is switched to enter the state shown in FIG. 2(a). When the compressor (51) is operated in this state, the refrigerant is circulated in the refrigerant circuit (45) to execute a first refrigeration cycle where the first heat exchanger (47) functions as a condenser and the second heat exchanger (49) functions as an evaporator. To be more specific, the refrigerant discharged out of the compressor (51) is condensed in the first heat exchanger (47) by dissipating heat, and then transferred to the motor-operated expansion valve (55) for pressure reduction. The pressure-reduced refrigerant absorbs heat to evaporate in the second heat exchanger (49) and then sucked into the compressor (51) for compression. The compressed refrigerant is discharged again out of the compressor (51).

During the first action, the second aperture (11b), the third aperture (11c), the fifth aperture (9a) and the eighth aperture (9d) are opened, while the first aperture (11a), the fourth aperture (11d), the sixth aperture (9b) and the seventh aperture (9c) are closed. As shown in FIGS. 4(a) to 4(c), the room air (RA) as the second air is supplied to the first heat exchanger (47) and the outside air (OA) as the first air is supplied to the second heat exchanger (49).

Specifically, the second air entered the system from the room air inlet (39) is sent to the right spatial area (13b) of the third spatial area (13) through the second flow-in passage (29) and the fifth aperture (9a). In the right spatial area (13b), the second air passes through the first heat exchanger (47) from top to bottom, while the adsorbent supported on the surfaces of the fins (57) is heated by the refrigerant to desorb moisture. The moisture desorbed by the adsorbent is supplied to the second air passing through the first heat exchanger (47). The second air supplied with the moisture in the first heat exchanger (47) flows out of the right spatial area (13b) of the third spatial area (13) to the first flow-out passage (25) through the third aperture (11c). Then, the second air is sucked through the exhaust fan (37) and discharged out of the room through the exhaust outlet (35) as exhaust air (EA).

The first air entered the system from the outside air inlet (33) is sent to the left spatial area (13a) of the third spatial area (13) through the first flow-in passage (23) and the second aperture (11b). In the left spatial area (13a), the first air passes through the second heat exchanger (49) from top to bottom, while the adsorbent supported on the surfaces of the fins (57) adsorbs moisture in the first air. The heat of adsorption generated at this time is absorbed by the refrigerant. The first air dehumidified in the second heat exchanger (49) flows out of the left spatial area (13a) of the third spatial area (13) to the second flow-out passage (31) through the eighth aperture (9d). Then, the first air is sucked through the air supply fan (43) and supplied to the inside of the room from the air supply outlet (41) as supply air (SA).

Next, a second action during the dehumidifying operation is explained with reference to FIGS. 2(a) and 2(b) and FIGS. 5(a) to 5(c). In the second action, the adsorbent is recovered in the second heat exchanger (49) and the outside air (OA) as the first air is dehumidified in the first heat exchanger (47).

During the second action, the four-way switch valve (53) in the refrigerant circuit (45) is switched to enter the state shown in FIG. 2(b). When the compressor (51) is operated in this state, the refrigerant is circulated in the refrigerant circuit (45) to execute a second refrigeration cycle where the first heat exchanger (47) functions as an evaporator and the second heat exchanger (49) functions as a condenser. To be more specific, the refrigerant discharged out of the compressor (51) is condensed in the second heat exchanger (49) by dissipating heat, and then transferred to the motor-operated expansion valve (55) for pressure reduction. The pressure-reduced refrigerant absorbs heat to evaporate in the first heat exchanger (47) and then sucked into the compressor (51) for compression. The compressed refrigerant is discharged again out of the compressor (51).

During the second action, the first aperture (11a), the fourth aperture (11d), the sixth aperture (9b) and the seventh aperture (9c) are opened, while the second aperture (11b), the third aperture (11c), the fifth aperture (9a) and the eighth aperture (9d) are closed. As shown in FIGS. 5(a) to 5(c), the outside air (OA) as the first air is supplied to the first heat exchanger (47) and the room air (RA) as the second air is supplied to the second heat exchanger (49).

Specifically, the second air entered the system through the room air inlet (39) is sent to the left spatial area (13a) of the third spatial area (13) through the second flow-in passage (29) and the sixth aperture (9b). In the left spatial area (13a), the second air passes through the second heat exchanger (49) from top to bottom, while the adsorbent supported on the surfaces of the fins (57) is heated by the refrigerant to desorb moisture. The moisture desorbed by the adsorbent is supplied to the second air passing through the second heat exchanger (49). The second air supplied with the moisture in the second heat exchanger (49) flows out of the left spatial area (13a) of the third spatial area (13) to the first flow-out passage (25) through the fourth aperture (11d). Then, the second air is sucked through the exhaust fan (37) and discharged out of the room from the exhaust outlet (35) as exhaust air (EA).

The first air entered the system through the outside air inlet (33) is sent to the right spatial area (13b) of the third spatial area (13) through the first flow-in passage (23) and the first aperture (11a). In the right spatial area (13b), the first air passes through the first heat exchanger (47) from top to bottom, while the adsorbent supported on the surfaces of the fins (57) adsorbs moisture in the first air. The heat of adsorption generated at this time is absorbed by the refrigerant. The first air dehumidified in the first heat exchanger (47) flows out of the right spatial area (13b) of the third spatial area (13) to the second flow-out passage (31) through the seventh aperture (9c). Then, the first air is sucked through the air supply fan (43) and supplied to the inside of the room from the air supply outlet (41) as supply air (SA).

(Humidifying Operation)

In the humidifying operation, the air supply fan (43) and the exhaust fan (37) are operated in the humidity control system. The humidity control system takes the room air (RA) therein as first air to exhaust it to the outside of the room and takes the outside air (OA) therein as second air to supply it to the inside of the room.

First, explanation of a first action during the humidifying operation is provided with reference to FIGS. 2(a) and 2(b) and FIGS. 6(a) to 6(c). In the first action, the outside air (OA) as the second air is humidified in the first heat exchanger (47) and moisture in the room air (RA) as the first air is collected in the second heat exchanger (49).

During the first action, the four-way switch valve (53) in the refrigerant circuit (45) is switched to enter the state shown in FIG. 2(a). When the compressor (51) is operated in this state, the refrigerant is circulated in the refrigerant circuit (45) to execute a first refrigeration cycle where the first heat exchanger (47) functions as a condenser and the second heat exchanger (49) functions as an evaporator.

Figure 6:
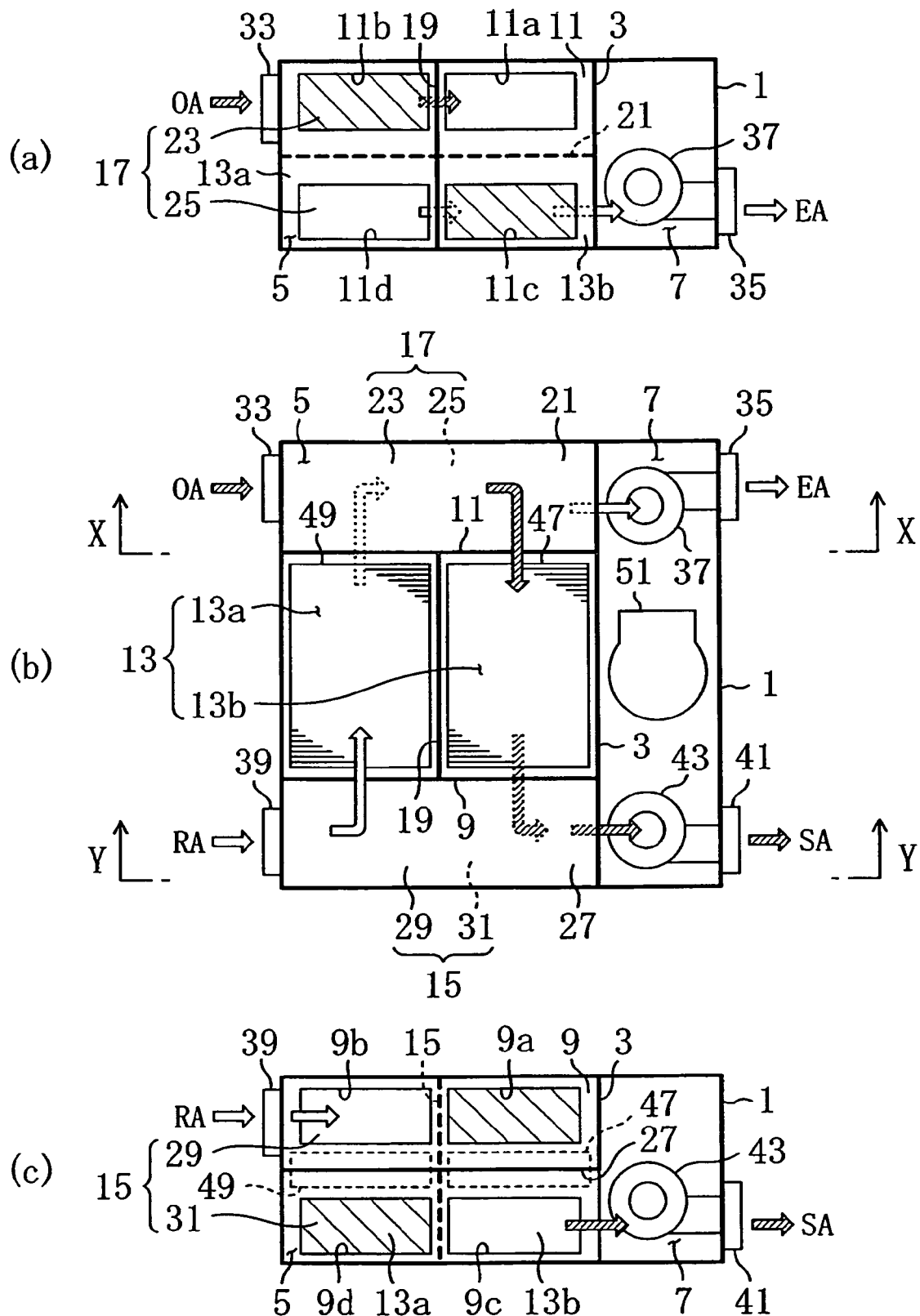
FIGS. 6(a) to 6(c) are schematic views illustrating the humidity control system together with the flow of air during a first action of humidifying operation.
Figure 7:
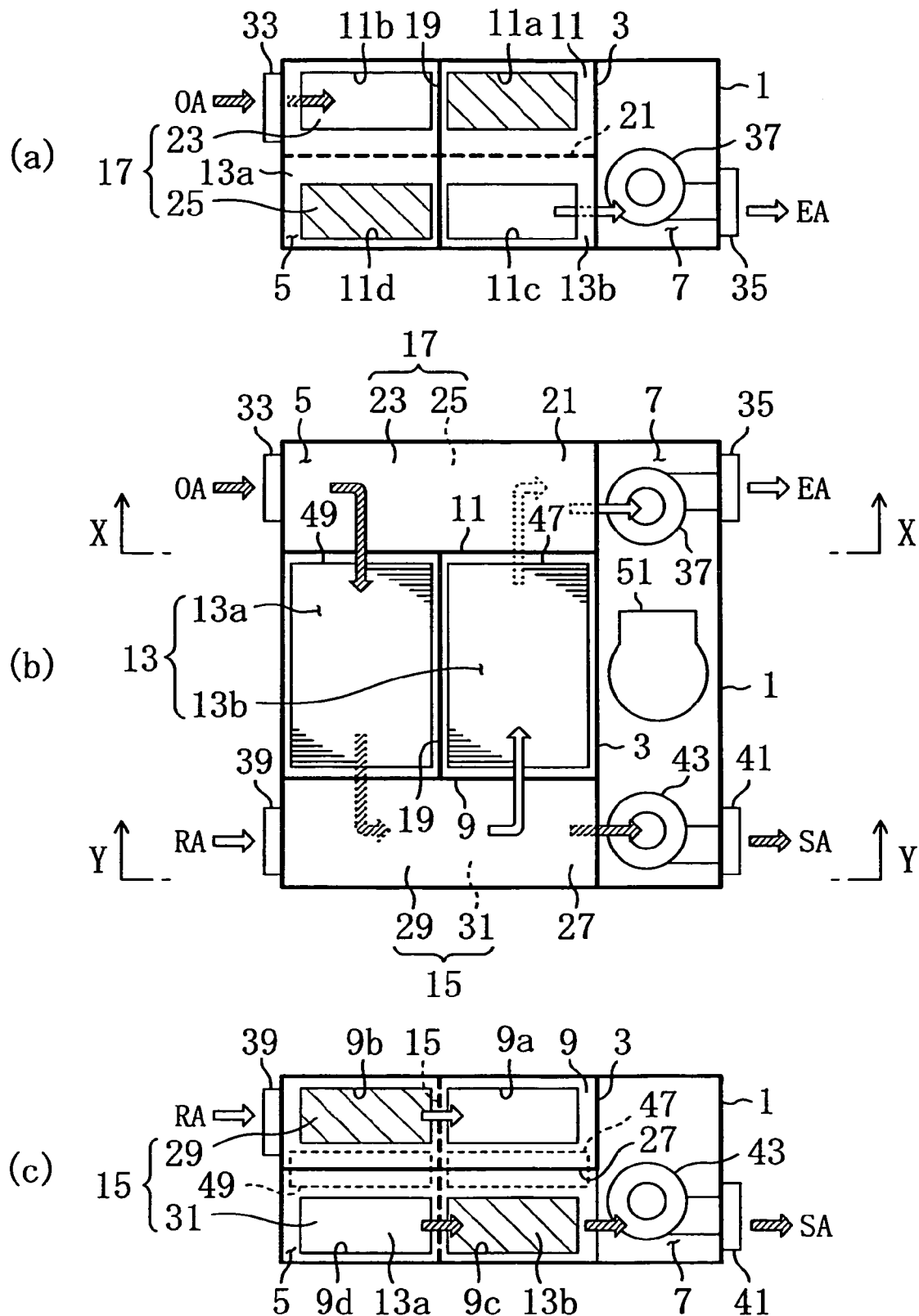
FIGS. 7(a) to 7(c) are schematic views illustrating the humidity control system together with the flow of air during a second action of the humidifying operation.

During the first action, the first aperture (11a), the fourth aperture (11d), the sixth aperture (9b) and the seventh aperture (9c) are opened, while the second aperture (11b), the third aperture (11c), the fifth aperture (9a) and the eighth aperture (9d) are closed. As shown in FIG. 6, the outside air (OA) as the second air is supplied to the first heat exchanger (47) and the room air (RA) as the first air is supplied to the second heat exchanger (49).

Specifically, the first air entered the system from the room air inlet (39) is sent to the left spatial area (13a) of the third spatial area (13) through the second flow-in passage (29) and the sixth aperture (9b). In the left spatial area (13a), the first air passes through the second heat exchanger (49) from top to bottom. In the second heat exchanger (49), the adsorbent supported on the surfaces of the fins (57) adsorbs moisture in the first air. The heat of adsorption generated at this time is absorbed by the refrigerant. The first air that lost the moisture passes through the fourth aperture (11d), the first flow-out passage (25) and the exhaust fan (37) in this order to be discharged out of the room from the exhaust outlet (35) as exhaust air (EA).

The second air entered the system from the outside air inlet (33) is sent to the right spatial area (13b) of the third spatial area (13) through the first flow-in passage (23) and the first aperture (11a). In the right spatial area (13b), the second air passes through the first heat exchanger (47) from top to bottom, while the adsorbent supported on the surfaces of the fins (57) is heated by the refrigerant to desorb moisture. The moisture desorbed by the adsorbent is supplied to the second air passing through the first heat exchanger (47). The humidified second air passes through the seventh aperture (9c), the second flow-out passage (31) and the air supply fan (43) in this order to be supplied to the inside of the room from the air supply outlet (41) as supply air (SA).

Next, a second action during the humidifying operation is explained with reference to FIGS. 2(a) and 2(b) and FIGS. 7(a) to 7(c). In the second action, the outside air (OA) as the second air is humidified in the second heat exchanger (49) and moisture is collected from the room air (RA) as the first air in the first heat exchanger (47).

During the second action, the four-way switch valve (53) in the refrigerant circuit (45) is switched to enter the state shown in FIG. 2(b). When the compressor (51) is operated in this state, the refrigerant is circulated in the refrigerant circuit (45) to execute a second refrigeration cycle where the first heat exchanger (47) functions as an evaporator and the second heat exchanger (49) functions as a condenser.

During the second action, the second aperture (11b), the third aperture (11c), the fifth aperture (9a) and the eighth aperture (9d) are opened, while the first aperture (11a), the fourth aperture (11d), the sixth aperture (9b) and the seventh aperture (9c) are closed. As shown in FIGS. 7(a) to 7(c), the room air (RA) as the first air is supplied to the first heat exchanger (47) and the outside air (OA) as the second air is supplied to the second heat exchanger (49).

Specifically, the first air entered the system from the room air inlet (39) is sent to the right spatial area (13b) of the third spatial area (13) through the second flow-in passage (29) and the fifth aperture (9a). In the right spatial area (13b), the first air passes through the first heat exchanger (47) from top to bottom, while the adsorbent supported on the surfaces of the fins (57) adsorbs moisture in the first air. The heat of adsorption generated at this time is absorbed by the refrigerant. Then, the first air that lost the moisture passes through the third aperture (11c), the first flow-out passage (25) and the exhaust fan (37) in this order to be discharged out of the room from the exhaust outlet (35) as exhaust air (EA).

The second air entered the system from the room air inlet (33) is sent to the left spatial area (13a) of the third spatial area (13) through the first flow-in passage (23) and the second aperture (11b). In the left spatial area (13a), the second air passes through the second heat exchanger (49) from top to bottom, while the adsorbent supported on the surfaces of the fins (57) is heated by the refrigerant to desorb moisture. The moisture desorbed by the adsorbent is supplied to the second air passing through the second heat exchanger (49). Then, the humidified second air passes through the eighth aperture (9d), the second flow-out passage (31) and the air supply fan (43) in this order to be supplied to the inside of the room from the air supply outlet (41) as supply air (SA).

The dehumidifying and humidifying operations in a full ventilation mode are explained above. The humidity control system is operated also in the following modes.

The humidity control system also performs dehumidification in a circulation mode in which the room air (RA) is taken as the first air and supplied to the inside of the room and the outside air (OA) is taken as the second air and discharged out of the room.

The humidity control system also performs humidification in a circulation mode in which the outside air (OA) is taken as the first air and discharged out of the room and the room air (RA) is taken as the second air and supplied to the inside of the room.

The humidity control system also performs dehumidification in an air supply mode in which the outside air (OA) is taken as the first air and supplied to the inside of the room and the outside air (OA) is taken as the second air and discharged out of the room.

The humidity control system also performs humidification in an air supply mode in which the outside air (OA) is taken as the first air and discharged out of the room and the outside air (OA) is taken as the second air and supplied to the inside of the room.

The humidity control system also performs dehumidification in an exhaust mode in which the room air (RA) is taken as the first air and supplied to the inside of the room and the room air (RA) is taken as the second air and discharged out of the room.

The humidity control system also performs humidification in an exhaust mode in which the room air (RA) is taken as the first air and discharged out of the room and the room air (RA) is taken as the second air and supplied to the inside of the room.

—Effect of the Present Embodiment—

In the above-described humidity control system, the first and second heat exchangers (47, 49) are repetitively heated and cooled by the refrigerant and the fins (57) repeat thermal expansion and contraction. At this time, the adsorbent layer (58) laminated on the surfaces of the fins (57) follows the expansion and contraction of the fins (57) without falling off the fins (57).

More specifically, the adsorbent layer (58) thermally expands and contracts in the same manner as the fins (57) thermally expand and contract because the linear thermal expansion coefficient of the adsorbent layer (58) is close to that of the fins (57). As a result, thermal stress caused between the adsorbent layer (58) and the fins (57) is reduced, thereby preventing the falling off of the adsorbent layer (58) and improving the durability of the adsorbent layer (58). It is preferred that the linear thermal expansion coefficient of the adsorbent layer (58) is substantially equal to that of the fins (57). The smaller the difference between their linear thermal expansion coefficients is, the more the following ability of the adsorbent layer is improved.

A urethane resin is used as the binder. The urethane resin has a linear thermal expansion coefficient higher than that of an aluminum alloy used as material for the fins (57). This makes it possible to bring the linear thermal expansion coefficient of the adsorbent layer (58) close to that of the fins (57) effectively.

Further, the urethane resin belongs to an organic water-based emulsion binder. With use of the organic water-based emulsion binder, the adsorbent layer (58) is given with higher flexibility as compared with the case where an inorganic binder is used. As a result, the adsorbent layer (58) becomes resistant against abrupt temperature change and impact and less likely to fall off, thereby obtaining excellent adhesion property. When the linear thermal expansion coefficients of the adsorbent layer (58) and the fins (57) are brought close to each other but do not match exactly, thermal stress may occur at the interface between the adsorbent layer (58) and the fins (57) due to the mismatch. Even in this case, the adsorbent layer (58) absorbs the thermal stress with its own flexibility, and therefore hardly falls off the fins (57). Thus, the durability of the adsorbent layer (58) is further improved.

—Other Features—

Embodiment 1 of the present invention may be configured as follows. Although zeolite is used as the adsorbent, other material may be used as long as it has excellent moisture adsorption property. Examples of the material include silica gel, a mixture of zeolite and silica gel, activated carbon, organic polymer material having hydrophilicity or water absorption property, ion exchange resin material having a carboxyl or sulfonic acid group, functional polymer material such as temperature sensitive polymer and clay mineral material such as sepiolite, imogolite, allophane and kaolinite.

Other than the urethane resin, an acrylic resin or an ethylene-vinyl acetate copolymer may be used as the binder. They have excellent flexibility and make it possible for the adsorbent layer to follow the thermal expansion and contraction of the fins (57). When mixed with the adsorbent to form the adsorbent layer (58), these materials bring the linear thermal expansion coefficient of the adsorbent layer (58) close to that of the fins (57).

Embodiment 2

Next, detailed explanation of Embodiment 2 of the present invention is provided.

According to the present embodiment, the thickness t and the thermal conductivity $\lambda$ of the adsorbent layer (58) are specified. The present embodiment may be achieved irrespective of the relationship between the linear thermal expansion coefficients of the material for the fins (57), the adsorbent and the binder explained in Embodiment 1. Alternatively, the present embodiment may be achieved in combination with the relationship between the linear thermal expansion coefficients of the material for the fins (57), the adsorbent and the binder explained in Embodiment 1.

The thickness t (mm) and the thermal conductivity $\lambda$ (W/mK) of the adsorbent layer (58) satisfy $t/\lambda \leq 10$. Therefore, when an adsorbent having a low thermal conductivity $\lambda$ is used, the adsorbent layer (58) is made thin. On the contrary, when an adsorbent having a high thermal conductivity $\lambda$ is used, the adsorbent layer (58) is made thick.

When $t/\lambda \leq 10$, thermal resistance of the adsorbent layer (58) is kept low. Therefore, heat exchange between the refrigerant circulating in the refrigeration circuit and the target air is carried out with high efficiency. As a result, the amount of sensible heat exchanged in the first and second heat exchangers (47, 49) is increased.

The relational expression $t/\lambda \leq 10$ is appropriate from the following calculation results.

Figure 8:
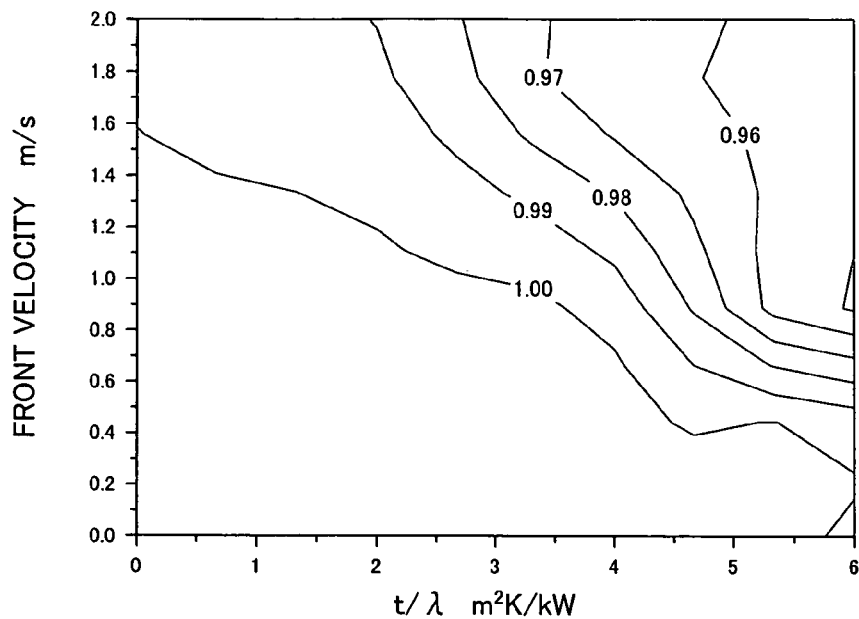
FIG. 8 is a graph according to Embodiment 2 illustrating the calculation results of $Q/Q_0$ when the fin pitch is 1.2 mm.

Suppose that the fins (57) are arranged at a fin pitch of 1.2 mm and $t/\lambda$ ($m^2K/kW$) and the front velocity (m/s) of the target air are variables, the ratio of the amount of sensible heat exchanged in a heat exchanger with the adsorbent (e.g., zeolite) supported thereon (Q) to the amount of sensible heat exchanged in a heat exchanger with the adsorbent not supported thereon ($Q_0$) is calculated. As shown in FIG. 8, the calculation result is $Q/Q_0 \geq 0.96$ when $t/\lambda \leq 6$.

Figure 9:
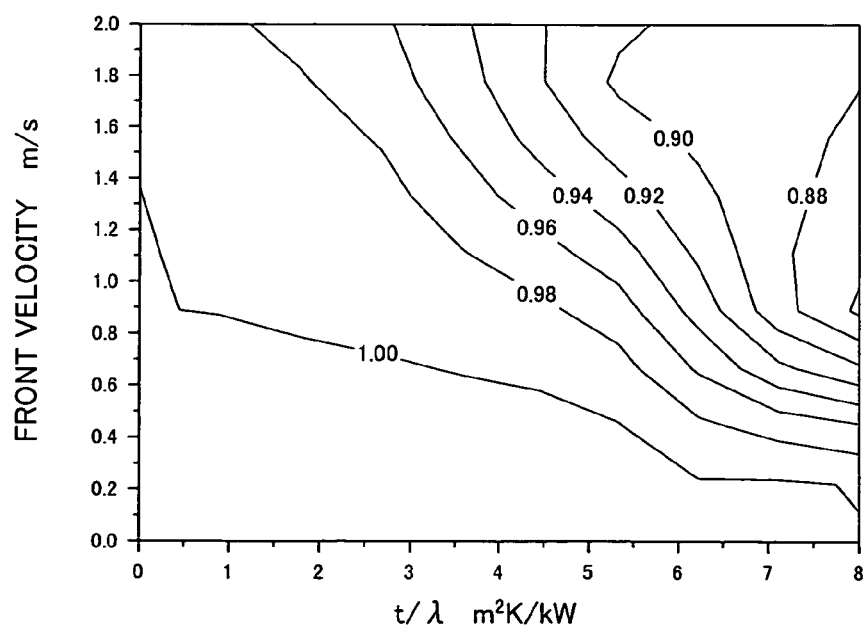
FIG. 9 is a graph according to Embodiment 2 illustrating the calculation results of $Q/Q_0$ when the fin pitch is 1.6 mm.

When the fins (57) are arranged at a fin pitch of 1.6 mm, the calculation result is $Q/Q_0 \geq 0.88$ when $t/\lambda \leq 8$ as shown in FIG. 9.

Figure 10:
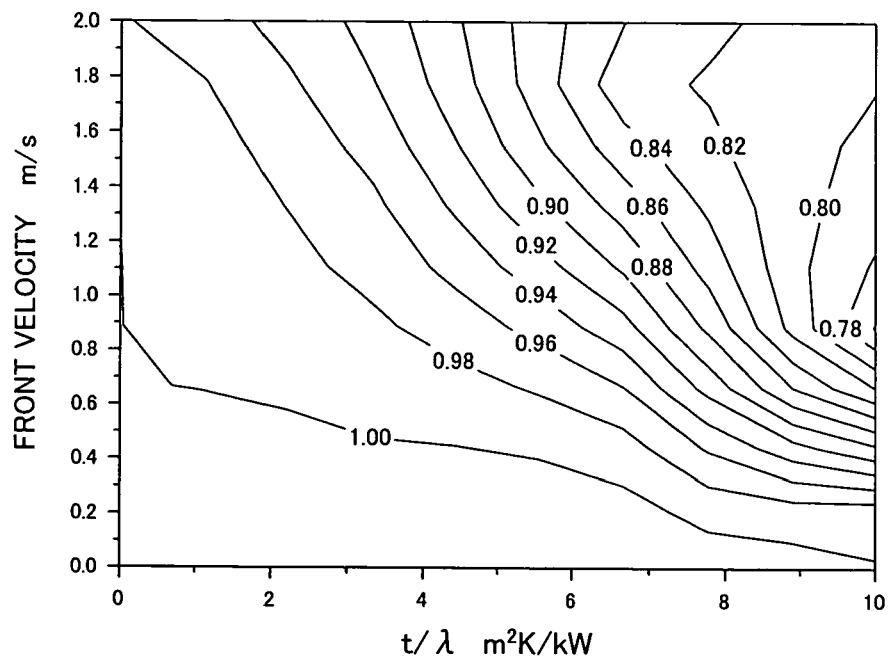
FIG. 10 is a graph according to Embodiment 2 illustrating the calculation results of $Q/Q_0$ when the fin pitch is 2.0 mm.

When the fins (57) are arranged at a fin pitch of 2.0 mm, the calculation result is $Q/Q_0 \geq 0.80$ when $t/\lambda \leq 10$ as shown in FIG. 10.

Thus, when the fin pitch is 1.2 mm, 1.6 mm or 2.0 mm and $t/\lambda \leq 10$, $Q/Q_0 \geq 0.80$ is obtained. It is considered that a large amount of sensible heat is exchanged in the first and second heat exchangers (47, 49) as long as $Q/Q_0 \geq 0.80$. Therefore, if the adsorbent layer (58) on the surfaces of the fins (57) satisfies $t/\lambda \leq 10$, thermal resistance in the adsorbent layer (58) is reduced, thereby increasing the amount of sensible heat exchanged in the first and second heat exchangers (47, 49).

The front velocity of the target air is not less than 0.5 m/s and not more than 1.5 m/s when the first and second heat exchangers (47, 49) are operated. Therefore, for the trial calculation of $Q/Q_0$, the range of the front velocity is specified to be not less than 0 m/s and not more than 2.0 m/s.

As shown in FIGS. 8, 9 and 10, the value $t/\lambda$ ($m^2K/kW$) that meets $Q/Q_0 \geq 0.80$ decreases as the fin pitch becomes longer. Therefore, for example, $t/\lambda \leq 5$ is preferable if the fins (57) are arranged at a fin pitch of 3.5 mm in the heat exchanger.

The thickness t (mm) of the adsorbent layer (58) on the surfaces of the fins (57) is not less than 0.05 mm and not more than 0.5 mm. If the thickness t (mm) of the adsorbent layer (58) is within the specified range, pressure loss is reduced, fan efficiency is improved and fan noise is reduced.

The adsorbent used in the adsorbent layer (58) may be zeolite, silica gel, activated carbon, organic polymer material having hydrophilicity or water absorption property, ion exchange resin material having a carboxyl or sulfonic acid group, functional polymer material such as temperature sensitive polymer and clay mineral material such as sepiolite, imogolite, allophane and kaolinite. The thermal conductivity of these materials is not less than 0.05 W/mK and not more than 1 W/mK.

The adsorbent layer (58) contains an adhesive in addition to the adsorbent. It is considered that the thermal conductivity $\lambda$ of the adsorbent layer (58) in the thickness direction approaches to the value of the thermal conductivity of the adsorbent.

As a method for forming the adsorbent layer (57) on the surfaces of the fins (57), the adsorbent may be supported on the fins (57) by dipping. The adsorbent layer (58) may be formed by any method as long as the performance of the adsorbent is not impaired.

If the adsorbent is supported by dipping, the adsorbent layer (58) is formed on the other parts than the fins (57), e.g., the framework (61), the heat transfer tube (63) and the connector tube (65). If the adsorbent layer (58) is formed also on the other parts than the fins (57), the adsorbent layer (58) on the other parts may be formed thicker than the adsorbent layer (58) on the fins (57) because there is no need of taking the degree of the thermal stress into account.

Other features and effects are the same as those of Embodiment 1.

Embodiment 3

Next, detailed explanation of Embodiment 3 of the present invention is provided.

According to the present embodiment, part of the adsorbent layer (58) adjacent to the fin and an outermost part thereof have different adsorbent content ratios. The present embodiment may be achieved irrespective of the relationship between the linear thermal expansion coefficients of the material for the fins (57), the adsorbent and the binder explained in Embodiment 1. Alternatively, the present embodiment may be achieved in combination with at least any one of the relationship between the linear thermal expansion coefficients explained in Embodiment 1 and the relationship between the thickness and the thermal conductivity of the adsorbent layer (58) explained in Embodiment 2.

To be more specific, the adsorbent layer (58) has a multilayer structure including a layer adjacent to the fin (58a), a second layer (58b), a third layer (58c) and an outermost layer (58d).

Figure 11:
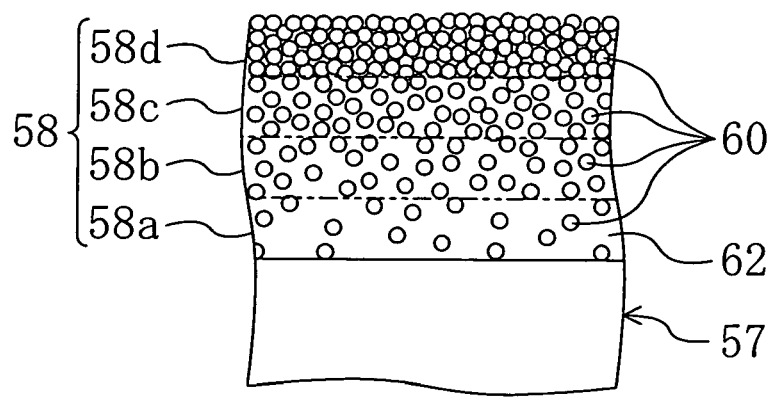
FIG. 11 is a schematic sectional view according to Embodiment 3 illustrating an adsorbent layer supported on the surfaces of the fins of the heat exchanger.

In FIG. 11, "○" represents particles of an adsorbent (60). The higher the density of "○" is, the higher the ratio of the adsorbent contained is. In FIG. 11, the density of "○" (particles of the adsorbent (60)) is depicted with exaggeration to show the adsorbent content ratio clearly.

The adsorbent content ratio gradually increases from the adjacent layer (58a) to the outermost layer (58d). The content of the adsorbent (60) is the lowest in the adjacent layer (58a) and the highest in the outermost layer (58d). In the adsorbent layer (58), the content of the binder (62) is the highest in the adjacent layer (58a) and the lowest in the outermost layer (58d).

In order to form the adsorbent layer (58), the surfaces of the fins (57) are subjected to surface treatment, and then slurry prepared by mixing the adsorbent (60) and a binder solution is applied thereto and dried to solidify. Thus, the adsorbent (60) and the fins (57) are bonded to each other by the binder (62), and so are the particles of the adsorbent (60). At this time, if slurries having different adsorbent content ratios are applied sequentially, the multilayered adsorbent layer (58) is obtained. If the slurries are applied in the ascending order of the adsorbent content ratio, the adsorbent content ratio decreases toward the fin (57) and increases toward the outermost layer (58d). As the surface treatment, degreasing treatment may be carried out to render the surfaces of fins (57) nonrepellent to the slurry.

—Effect of the Present Embodiment—

In the above-described humidity control system, when the first or second air passes through the first or second heat exchanger (47 or 49) serving as an evaporator, the outermost part of the adsorbent layer (58) which is outermost of the first and second heat exchangers (47, 49), i.e., the outermost layer (58d), adsorbs moisture in the first or second air with efficiency because the outermost layer (58d) which is most likely to contact the air contains a relatively large amount of the adsorbent (60).

Further, since the layer (58a) adjacent to the fin including an interface between the adsorbent layer (58) and the fin (57) contains a relatively large amount of the binder (62), the adsorbent layer (58) is firmly bonded to the fin (57).

If the adsorbent layer (58) formed on the outer surfaces of the first and second heat exchangers (47, 49) is configured such that the adjacent layer (58a) contains a relatively large amount of the binder (62) and the outermost layer (58d) contains a relatively large amount of the adsorbent (60), the adsorbent layer (58) is improved in both of the adhesion to the fins (57) and the adsorption of moisture from the air.

The adsorbent layer (58) is multilayered. Therefore, even if a bending load is applied to the adsorbent layer (58) to generate a crack in the thickness direction, the growth of the crack stops at the interface between the layers. Thus, the adsorbent layer (58) is resistant against the crack in the thickness direction.

Due to the multilayered structure of the adsorbent layer (58), the adsorbent content ratio gradually increases from the adjacent layer (58a) to the outermost layer (58d). That is, not only the adjacent layer (58a), the second layer (58b) close to the surface of the fin (57) also has excellent adhesion property. Further, in addition to the outermost layer (58d), the third layer (58c) close to the outer surface of the adsorbent layer (58) also has excellent adsorption property. Thus, the adsorbent layer (58) itself is improved both in adhesion and adsorption properties.

If the binder (62) is a urethane resin, an acrylic resin or an ethylene-vinyl acetate copolymer, the adsorbent layer (58) is provided with higher resistance against impact as compared with the case where an inorganic binder such as cement is used.

Other features and effects of the present embodiment is the same as those of Embodiment 1.

Embodiment 4

According to the present embodiment, the adsorbent layer (58) is a solid layer obtained by drying an organic water-based emulsion binder mixed with an adsorbent. Part of the adsorbent layer (58) adjacent to the fin and an outermost part of the adsorbent layer (58) are different in the ratio of the adsorbent contained therein. The present embodiment may be achieved irrespective of the relationship between the linear thermal expansion coefficients of the material for the fins (57), the adsorbent and the binder explained in Embodiment 1. Alternatively, the present embodiment may be achieved in combination with at least any one of the relationship between the linear thermal expansion coefficients explained in Embodiment 1, the relationship between the thickness of the adsorbent layer (58) and the thermal conductivity explained in Embodiment 2 and the relationship between the adsorbent content ratios of the part adjacent to the fin and the outermost part of the adsorbent layer (58) explained in Embodiment 3.

To be more specific, the dry solid layer of the organic water-based emulsion binder is more flexible than a dry solid layer of an inorganic binder, resistant against abrupt temperature change and impact and less likely to fall off. Even if the fins (57) and the adsorbent layer (58) are significantly different in thermal expansion coefficient, they are favorably adhered to each other. The excellent adhesion is ensured even if the amount of the binder par unit area is reduced to increase the amount of the adsorbent. Therefore, latent heat processing capability is enhanced without increasing the thickness of the adsorbent layer (58) more than necessary or upsizing the heat exchangers (47, 49).

The thickness of the adsorbent layer (58) on the surfaces of the fins (57) is preferably not less than 50 μm and not more than 500 μm from the viewpoint of reducing pressure loss, improving fan efficiency and reducing fan noise. The adsorbent layer (58) may be formed on the other components than the fins (57). In this case, the adsorbent layer supported on the other components than the fins (57) that does not affect very much on the increase in pressure loss (e.g., the framework (61), the heat transfer tube (63) and the connector tube (65)) may be formed thicker than the adsorbent layer supported on the fins (57) to improve the adsorption/desorption performance.

Examples of the adsorbent include, for example, zeolite, silica gel, activated carbon, organic polymer material having hydrophilicity or water absorption property, ion exchange resin material having a carboxyl or sulfonic acid group, functional polymer material such as temperature sensitive polymer and clay mineral material such as sepiolite, imogolite, allophane and kaolinite. The adsorbent is not particularly limited as long as it is excellent in adsorbing moisture. However, taking dispersibility and viscosity into account, zeolite, silica gel or a mixture thereof is preferable.

The water-based emulsion binder is a urethane resin, an acrylic resin or an ethylene-vinyl acetate copolymer. The mass ratio between a solid portion of the water-based emulsion binder and the adsorbent is not lower than 1:3 and not higher than 1:10, preferably not lower than 1:5 and not higher than 1:8. Such a mass ratio makes it possible to ensure sufficient adhesion even if the temperature varies in a wide range. The adsorbent may be supported on the heat exchangers by immersing the heat exchangers into slurry mixed with the adsorbent. However, the method of supporting the adsorbent is not particularly limited as long as the performance of the adsorbent is ensured.

Figures 12, 13:
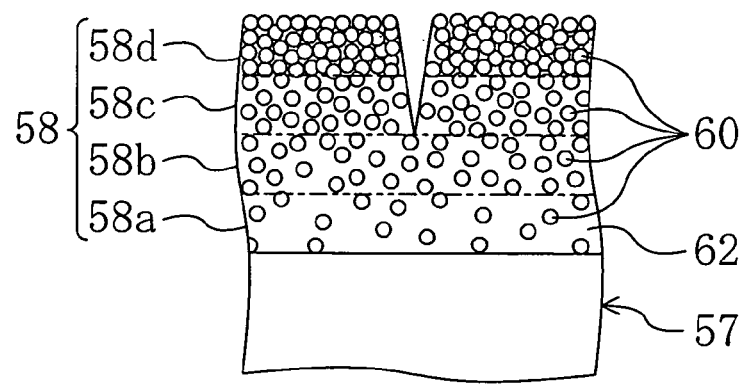
FIG. 12 is a schematic sectional view according to Embodiment 3 illustrating the adsorbent layer with a crack generated therein.
FIG. 13 is a table according to Embodiment 4 showing adhesion property and adsorption performance of adsorbent layers having different mass ratios between a solid portion of a water-based emulsion binder and the adsorbent.

FIG. 13 is a table showing the adhesion property (initial state) and the adsorption performance of the adhesion layer (58) corresponding to variations in mass ratio between the solid portion of the water-based emulsion binder and the adsorbent. In FIG. 13, zeolite is used as the adsorbent and a urethane resin is used as the water-based emulsion binder.

Referring to FIG. 13, "⊚" indicates that the adhesion property and adsorption performance are excellent, "○" indicates that the adhesion property and the adsorption performance are slightly inferior to those of "⊚" but do not cause any problem, "x" indicates that the adsorbent layer (58) is not usable because it falls off or the adsorption performance is not sufficiently exerted and "-" indicates that the adsorbent layer falls off and its adsorption performance cannot be measured.

As shown in FIG. 13, when the binder amount is reduced and the adsorbent amount is increased such that the mass ratio between the solid portion of the water-based emulsion binder and the adsorbent is set to 1:15, the adsorbent layer (58) becomes hard, thereby causing a crack to fall off. On the other hand, when the binder amount is increased and the adsorbent amount is reduced such that the mass ratio between the solid portion of the water-based emulsion binder and the adsorbent is set to 1:1, the adhesion property is improved, while the adsorption performance is reduced. When the mass ratio between the solid portion of the water-based emulsion binder and the adsorbent is not lower than 1:3 and not higher than 1:10, both of the adhesion property and the adsorption performance are satisfactory. Above all, when the mass ratio between the solid portion of the water-based emulsion binder and the adsorbent is not lower than 1:5 and not higher than 1:8, the adhesion property and the adsorption performance are excellent.

Other features and effects are the same as those of Embodiment 1.

INDUSTRIAL APPLICABILITY

The present invention is useful as a humidity control system using an adsorbent and a refrigeration cycle to control humidity in the air.

The invention claimed is:

1. A heat exchanger comprising:
a plurality of fins and an adsorbent capable of adsorbing moisture from the air and desorbing the moisture into the air,
wherein the surfaces of the fins are covered with an adsorbent layer containing the adsorbent and a binder for supporting the adsorbent on the surfaces of the fins,
the binder is selected so that linear thermal expansion coefficient of a material for the fins is between linear thermal expansion coefficient of the adsorbent and linear thermal expansion coefficient of the binder,
linear thermal expansion coefficient of the adsorbent layer is substantially equivalent to linear thermal expansion coefficient of the fins,
the adsorbent layer is constituted of a dry solid layer of a water-based emulsion binder mixed with the adsorbent, and
a mass ratio between a solid portion of the water-based emulsion binder and the adsorbent is not lower than 1:3 and not higher than 1:8.

2. The heat exchanger of claim 1, wherein
the binder has a linear thermal expansion coefficient not lower than the linear thermal expansion coefficient of the fins.

3. The heat exchanger of claim 1, wherein
the binder is an organic water-based emulsion binder.

4. The heat exchanger of claim 3, wherein
the water-based emulsion binder is a urethane resin, an acrylic resin or an ethylene-vinyl acetate copolymer.

5. The heat exchanger of claim 1, wherein
the adsorbent layer satisfies $t/\lambda \leqq 10$ wherein t is a thickness (mm) of the adsorbent layer and $\lambda$ is a thermal conductivity (W/mK) of the adsorbent layer in the thickness direction.

6. The heat exchanger of claim 5, wherein
a fin pitch is not less than 1.2 mm and not more than 3.5 mm.

7. The heat exchanger of claim 5, wherein
air velocity is not less than 0.5 m/s and not more than 1.5 m/s.

8. The heat exchanger of claim 5, wherein
the thickness t (mm) of the adsorbent layer is not less than 0.05 mm and not more than 0.5 mm.

9. The heat exchanger of claim 5, wherein
the thermal conductivity $\lambda$ (W/mK) of the adsorbent layer is not less than 0.05 W/mK and not more than 1.00 W/mK.

10. The heat exchanger of claim 5, wherein
the heat exchanger is a fin-and-tube heat exchanger.

11. The heat exchanger of claim 1, wherein
supposing that an adsorbent content ratio in the adsorbent layer is expressed by the mass ratio between the adsorbent and the binder (mass of the adsorbent/mass of the binder), part of the adsorbent layer adjacent to the surface of the fin has a higher adsorbent content ratio than an outermost part of the adsorbent layer in the thickness direction.

12. The heat exchanger of claim 11, wherein
the adsorbent layer has a multilayered structure in which the adsorbent content ratio varies in the thickness direction.

13. The heat exchanger of claim 12, wherein
the adsorbent content ratio in the adsorbent layer decreases toward the fin.

14. The heat exchanger of claim 11, wherein
the adsorbent is zeolite, silica gel or a mixture thereof and the binder is a urethane resin, an acrylic resin or an ethylene-vinyl acetate copolymer.

15. The heat exchanger of claim 1, wherein
the water-based emulsion binder is an organic water-based emulsion binder.

16. The heat exchanger of claim 15, wherein
the adsorbent is zeolite, silica gel or a mixture thereof, and the water-based emulsion binder is a urethane resin, an acrylic resin or an ethylene-vinyl acetate copolymer.

17. The heat exchanger of claim 15, wherein
the thickness t (mm) of the adsorbent layer is not less than 0.05 mm and not more than 0.5 mm.

18. A heat exchanger comprising a plurality of fins and an adsorbent capable of adsorbing moisture from the air and desorbing the moisture into the air, wherein
the surfaces of the fins are covered with an adsorbent layer containing the adsorbent and a binder for supporting the adsorbent on the surfaces of the fins
wherein the adsorbent layer is configured to follow thermal expansion or contraction of the fins caused by temperature change without falling off the fins,
the binder is selected so that linear thermal expansion coefficient of a material for the fins is between linear thermal expansion coefficient of the adsorbent and linear thermal expansion coefficient of the binder and
linear thermal expansion coefficient of the adsorbent layer is substantially equivalent to linear thermal expansion coefficient of the fins.

* * * * *